United States Patent
Herrell et al.

(10) Patent No.: US 10,318,767 B2
(45) Date of Patent: Jun. 11, 2019

(54) MULTI-TIER SECURITY FRAMEWORK

(71) Applicant: HEWLETT PACKARD ENTERPRISE DEVELOPMENT LP, Houston, TX (US)

(72) Inventors: Russ W. Herrell, Fort Collins, CO (US); Gregg B. Lesartre, Fort Collins, CO (US); Greg Astfalk, Plano, TX (US); Douglas L. Voigt, Boise, ID (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 166 days.

(21) Appl. No.: 15/535,361

(22) PCT Filed: Dec. 10, 2014

(86) PCT No.: PCT/US2014/069458
§ 371 (c)(1),
(2) Date: Jun. 12, 2017

(87) PCT Pub. No.: WO2016/093813
PCT Pub. Date: Jun. 16, 2016

(65) Prior Publication Data
US 2017/0329998 A1 Nov. 16, 2017

(51) Int. Cl.
*G06F 12/00* (2006.01)
*G06F 13/00* (2006.01)
(Continued)

(52) U.S. Cl.
CPC ............ *G06F 21/79* (2013.01); *G06F 3/0622* (2013.01); *G06F 3/0655* (2013.01);
(Continued)

(58) Field of Classification Search
CPC combination set(s) only.
See application file for complete search history.

(56) References Cited

U.S. PATENT DOCUMENTS 8,351,442 B1    1/2013  McGlaughlin
10,164,982 B1 * 12/2018  Lazarovitz ............. H04L 63/10
(Continued)

FOREIGN PATENT DOCUMENTS

WO    WO-2013-101209 A1    7/2013

OTHER PUBLICATIONS

Friedman, M. et al., IBM Data Center Networking Planning for Virtualization and Cloud Computing, (Research Paper), May 2011, 258 Pages.

(Continued)

*Primary Examiner* — Sean D Rossiter
(74) *Attorney, Agent, or Firm* — Hewlett Packard Enterprise Patent Department

(57) ABSTRACT

A security framework for a multi-tenant, multi-tier computer system with embedded processing is described. A multi-tenant security framework is created for a combined processing and storage hierarchy of multiple tiers. The multi-tenant security framework is applied to multiple execution levels of the memory device. The multi-tenant security framework is applied to multiple layers of application server software of the memory device. The multi-tenant security framework is also applied to multiple layers of storage server software of the memory device.

15 Claims, 5 Drawing Sheets

(51) Int. Cl.
*G06F 21/79* (2013.01)
*G06F 3/06* (2006.01)
*G06F 12/14* (2006.01)
*G06F 21/62* (2013.01)

(52) U.S. Cl.
CPC ........ *G06F 3/0688* (2013.01); *G06F 12/1491* (2013.01); *G06F 21/6218* (2013.01); *G06F 2212/1052* (2013.01)

(56) References Cited

U.S. PATENT DOCUMENTS

| | | | |
|---|---|---|---|
| 2007/0112801 A1* | 5/2007 | McGreevy | G06Q 10/06 |
| 2008/0077922 A1* | 3/2008 | Doring | G06F 12/1491 |
| | | | 718/100 |
| 2009/0049524 A1* | 2/2009 | Farrell | G06F 21/6218 |
| | | | 726/4 |
| 2012/0239860 A1 | 9/2012 | Atkisson et al. | |
| 2013/0124788 A1* | 5/2013 | Frost | G06F 12/0246 |
| | | | 711/103 |
| 2013/0275661 A1 | 10/2013 | Zimmer et al. | |
| 2013/0311989 A1 | 11/2013 | Ota et al. | |
| 2014/0108263 A1 | 4/2014 | Ortiz et al. | |
| 2014/0129767 A1 | 5/2014 | Ramanujan et al. | |
| 2014/0229945 A1 | 8/2014 | Barkai et al. | |
| 2017/0286694 A1* | 10/2017 | Swidowski | G06F 9/45558 |
| 2018/0024945 A1* | 1/2018 | Van de Waerdt | G06F 12/1441 |
| | | | 711/152 |
| 2018/0232524 A1* | 8/2018 | Allo | G06F 21/602 |

OTHER PUBLICATIONS

Sridhar, T, Cloud Computing—a Primer, (Research Paper), Sep. 29, 2009, 7 Pages.
VBLOCK ™ Solution for Trusted Multi-Tenancy: Technical Overview, (Research Paper), Aug. 2011, 76 Pages.
Vendors Answer IT's Questions about Storage Technologies for Tomorrow's Cloud, (Research Paper), Mar. 2012, 43 Pages.

* cited by examiner

200

500

MULTI-TIER SECURITY FRAMEWORK

BACKGROUND

Dynamic random access memory (DRAM) is a widely used memory media, but is volatile. As used herein, volatile indicates that the media loses its contents when power is removed. Advances in memory technology signal that DRAM will be replaced by a media which is nonvolatile, e.g., nonvolatile memory (NVM). This change in technology has many implications and will require significant changes in computing and security systems. The union of volatile DRAM and nonvolatile hard drive disk (HDD) will be replaced by NVM, where compute memory and storage functions are instead merged into the same hardware. Memory system administration policies of the operating system and the file system policies of the storage controller are to co-exist within the persistent memory of a converged server and storage infrastructure.

Most threats to data are characterized as either physical attacks or software attacks. Physical attacks are where the threat agent can get physical access to data storage devices or computer hardware and probe the interfaces or trace execution of threads, or other 'hands on' analysis. Software attacks are those where the threat agent launches requests for data to the storage devices via the same interfaces that are used by authorized computing agents. In the case of either type of malicious attack on a persistent memory (PM) device, the enforcement of security for the PM device will be different than for a traditional device in which volatile memory for computing functions is separate from nonvolatile storage.

BRIEF DESCRIPTION OF THE DRAWINGS

Certain examples are described in the following detailed description and in reference to the drawings, in which.

DETAILED DESCRIPTION OF SPECIFIC EXAMPLES

Figure 1:
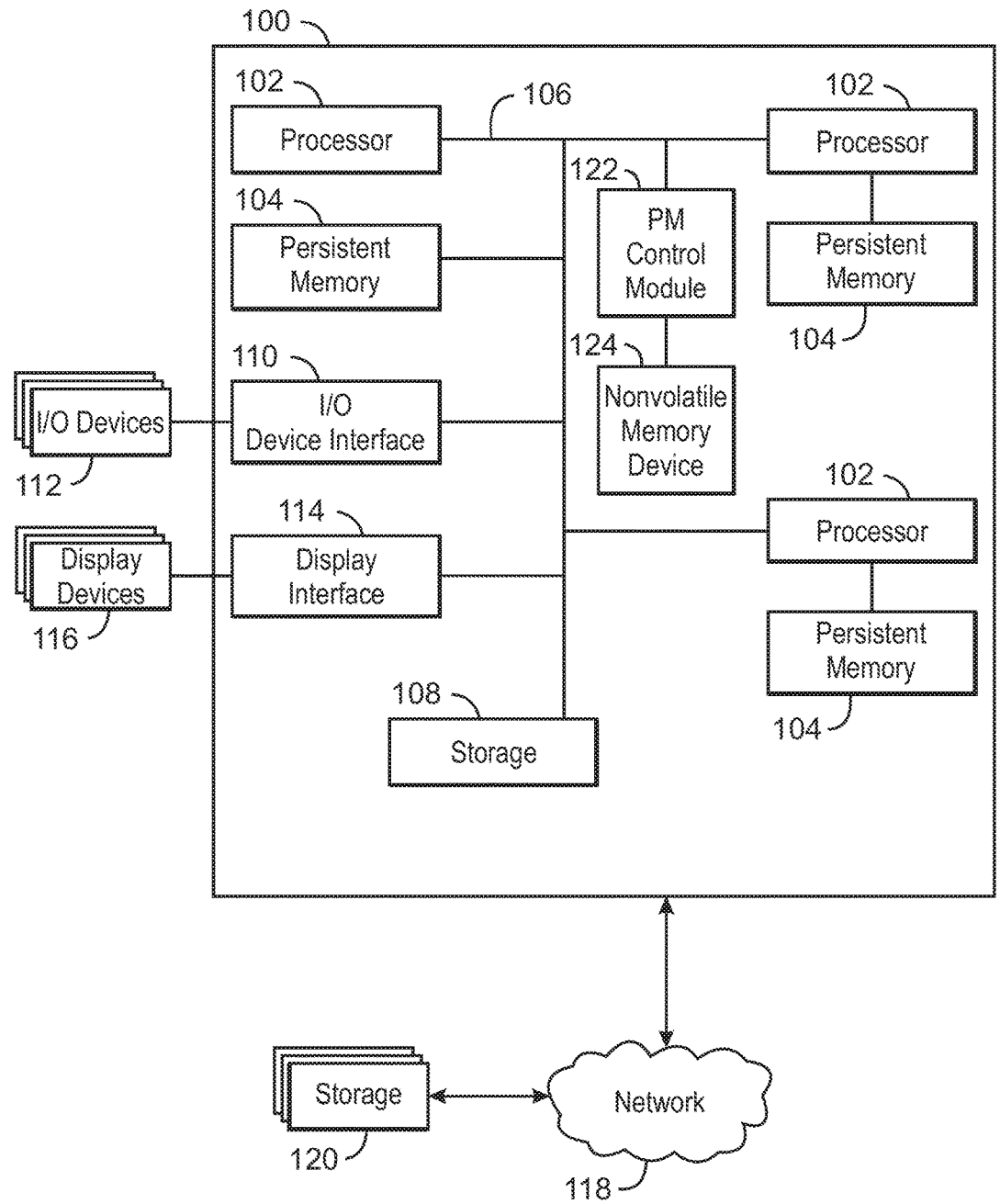
FIG. 1 is a block diagram of a computer system that can incorporate a multi-tier security framework.

Application servers and storage servers can use persistent memory (PM) technologies to host the same data objects for their solutions. Both application and storage servers may execute their solutions in distributed hardware, arranged in many combinations of clustered peers and multiple levels of a hardware hierarchy. In general, application servers create and manipulate data objects to provide functionality to users of the application software. While an application has data objects mapped to its working memory space, the data objects are considered as 'data-in-use'. The application and the operating system (OS) it runs within combine to safeguard the data-in-use and transition it to 'data-at-rest' in some form of permanent storage. In the current art, the security of data-at-rest is the responsibility of the storage manager code running on a logical storage server. The storage server can be just a block of code within the same OS as is hosting the application code, or can be a distinct physical server that hosts managed data services for one or more application servers.

PM devices are an emerging technology and can be used in PM arrays to act as both the main memory and the main storage of the computer system. This combines data-in-use and data-at-rest into the same physical device, and also combines the application functions and the storage functions onto the same hardware (HW) infrastructures. The converged nature of processing and storage in a PM device, or NVM device, can make data-in-use as persistent as data-at-rest, thus making data-in-use vulnerable to types of unauthorized accesses that are not a concern for traditional computing devices with physically and functionally separate DRAM and HDD. In addition, due to the potentially large amount of persistent memory that may be enabled by NVM devices, processing elements can be dispersed among the NVM devices to 'move the compute to the data' in order to improve performance. New tiers of computing can be introduced into new tiers of storage, and security of all data-at-rest is exposed to the threats accompanying the new computing process. A security framework is required that works on converged server and storage infrastructures that encompass multiple levels of application and storage computing resources embedded alongside multiple levels of data object storage in a multi-tenant environment with concurrent access.

A security framework for a multi-tenant processing and storage environment that is multi-layered or multi-tiered is described herein. The storage and processing environment is converged, and the security framework is enabled for a memory device with embedded processing. Converged storage is the combination of storage and computing hardware and processes. Memory and storage are occupying the same devices and, thus, the processing engines for storage operations and processing engines for computing operations are combined at each such device. Since storage (data-at-rest) is shared and disaggregated from a single application server, the memory (data-in-use) also becomes disaggregated as a result of the converged storage and memory paradigm. The security framework is directed toward a multi-tiered and multi-tenant environment predicated on this disaggregation. This combined processing requires a hierarchical multi-tenant security framework for such persistent memory (PM). A fabric is created, and the security framework identifies whether a requestor has appropriate access rights for a particular device on a particular tier of the multi-tier hierarchy.

FIG. 1 is a block diagram of a computer system 100 that can incorporate a multi-tier security framework. The computer system 100 may be, for example, a federation of compute nodes, a laptop computer, a desktop computer, a computer server, a smartphone, or a computing tablet, among others. The computer system 100 may include one or more processors 102 configured to execute stored instructions. The computer system 100 can also include one or more persistent memory devices 104 configured to store instructions that are executable by one of the processors 102. The processors 102 can include a single core processor, a dual-core processor, a multi-core processor, a computing cluster, or the like. The processors 104 can, for example, form part of an embedded computing system, wherein processing occurs at multiple endpoints and waypoints in the dataflow. The processors 102 may be coupled to the persistent memory devices 104 by a bus 106 where the bus 106 may be a communication system that transfers data between various components of the computer device 100. In examples, the bus 106 may be a custom protocol design, or a standard such as PCI, ISA, PCI-Express, HyperTransport®, NuBus, or the like. In examples, multiple buses 106 utilizing different protocols may connect devices in a computer system.

The persistent memory devices 104 may be implemented using, for example, persistent memory (PM), random access memory (RAM), e.g., SRAM, DRAM, zero capacitor RAM, eDRAM, EDO RAM, DDR RAM, RRAM, PRAM, battery backed-up DRAM, or any other suitable memory systems, as well as combinations thereof. Memory can be volatile or nonvolatile. Contents of volatile memory are lost when power to the memory is removed, while contents of nonvolatile memory are retained when power to the memory is removed. Additionally, persistence is the characteristic of state that outlives the particular process the state was created from. Typically when RAM loses power, like when a computer device is shutdown, the information stored on the memory would be lost. However, persistent memory stores data structures so access to the data is available using memory instructions or memory application programming interfaces even after the process that created or modified the data has ended. The persistent memory 104 of the computer system 100, and the multiple applications executed from and stored by persistent memory 104 and executed across computing tiers of the computer system 100, can introduce security issues. A security framework that is implemented across various hardware tiers and for multiple tenants can ensure access to persistent memory 104 is controlled.

The computer system 100 may also include a storage device 108. The storage device 108 may include non-volatile storage devices, such as a solid-state drive, a hard drive, an optical drive, a flash drive, an array of drives, or any combinations thereof. In some examples, methods, or application code segments tied to specific data objects or classes of data objects, stored in the storage device 108 can be executed by the processors 102. In some examples, storage (data-at-rest) can exist in the persistent memory devices 104 alongside data-in-use that applications are manipulating in the persistent memory devices 104. In some examples, processing can occur at intermediate processors, which may be, for example, one or more of the processors 102. In some examples, processing can occur at the persistent memory devices 104 themselves.

The computer system 100 may be linked to a network 118 through a physical connection, such as a cable, which may be an optical cable, a wired cable, a wireless network, and the like. A wireless local area network (WLAN) can establish a wireless connection between the computer system 100 and the network 118. Either a network connection cable or a wireless connection allows the computer system 100 to network with resources, such as, for example, the Internet, printers, fax machines, email, instant messaging applications, and with files located on storage servers. The network 118 can also be connected to storage devices 120. Access to the storage devices 120 can be controlled using the security framework described herein.

The computer system 100 may include a module or number of modules configured to provide the security framework described herein. For example, the computer system 100 can include a persistent memory (PM) control module 122. In some examples, an instruction executing on the processors 102 may indicate a requirement to access the contents of persistent memory 104 residing on the computer device 100. In some examples, an instruction executing on one of the processors 102 may indicate a requirement to access the contents of storage devices 108 existing on the computer system 100, or storage device 120 on the network 118. In some examples, the PM control module 122 can be configured to control access between and among the processors 102, persistent memory devices 104, and a nonvolatile memory device 124. In some examples, the PM control module 122 can be configured to control access between and among the processors 102, persistent memory devices 104, storage device 108, and nonvolatile memory device 124.

The block diagram of FIG. 1 is not intended to indicate that the computer system 100 is to include all of the components shown in FIG. 1. Further, any number of additional components may be included within the computer system 100, depending on the details of the specific implementation of the access control techniques and security framework described herein.

Figure 2:
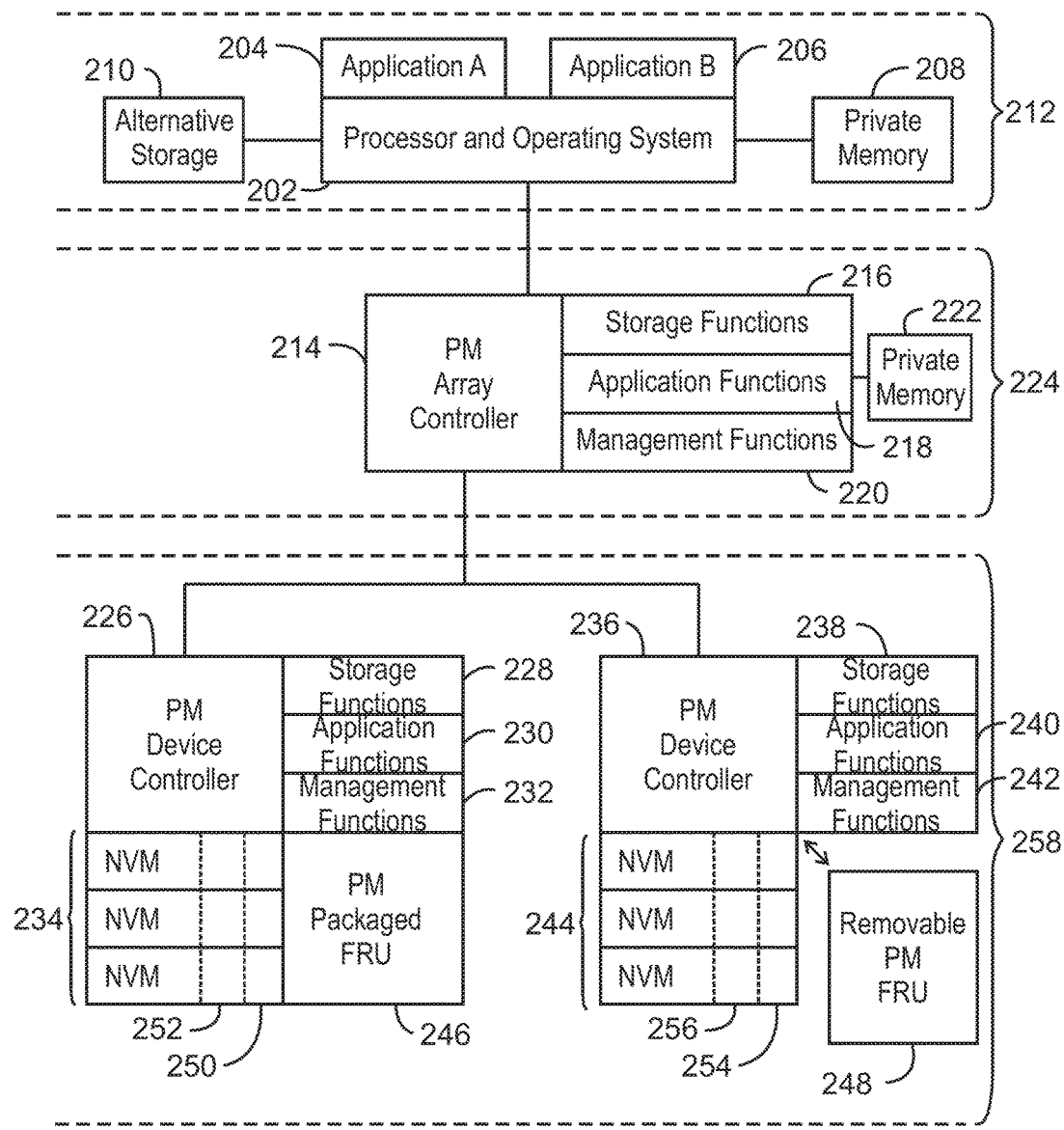
FIG. 2 is a diagram of a multi-tenant, multi-tier computer system with persistent memory and embedded processing that includes a security framework.

FIG. 2 is a diagram of a multi-tenant, multi-tier computer system 200 with persistent memory and embedded processing that includes a security framework. The security framework described with respect to FIG. 3 or 4, for example, can be implemented by the multi-tenant, multi-tier computer system 200. The multi-tenant, multi-tier computer system 200 has a memory-storage hierarchy based on the combination of physically distinct high-speed, volatile memory, and low-speed, dense persistence storage in a converged storage and computing environment. Because memory and storage are occupying the same devices, some of the processing engines for storage operations and computing operations become combined. A hierarchical, multi-tenant security framework for combined memory and storage, or persistent memory is described herein.

In some examples, the multi-tenant, multi-tier computer system 200 includes multiple processor and operating systems 202 (only one shown). The processor and operating system 202 can be connected to different applications, for example, Application A 204 and Application B 206. Application A 204 and Application B 206 can be considered tenants of the multi-tenant, multi-tier computer system 200. Private memory 208 can be connected to the processor and operating system 202. In some examples, private memory 208 can be a persistent memory device. Alternative storage 210 can also be connected to the processor and operating system 202. In some examples, alternative storage 210 can include a hard drive disk or some other nonvolatile memory.

The processor and operating system 202 exercise the primary computing functions for the first tier 212 of the multi-tenant, multi-tier computer system 200. In some examples, there may be more than one processor and operating system 202 in this tier 212. In some examples, the processor and operating system 202 are configured to control access of Application A 204 and Application B 206 to private memory 208. In some examples, private memory 208 includes storage and computing areas private to the processor and operating system 202, storage and computing areas private to Application A 204, and storage and computing areas private to Application B 206. In some examples, the alternative storage 210 includes storage areas private to the processor and operating system 202, storage areas private to Application A 204, and storage areas private to Application B 206.

A persistent memory (PM) array controller 214 is also included in the multi-tenant, multi-tier computer system 200. In some examples, multiple PM array controllers 214 can be included, and used to implement the security framework described herein. The PM array controller 214 includes storage functions 216, application functions 218, and management functions 220. The PM array controller 214 is to enable access to private memory 222. In some examples, private memory 222 can be a persistent memory device. The PM array controller 214 is to secure data against unauthorized access. In some examples, the PM array controller 214 can be configured to control access of the storage functions 216, application functions 218, and management functions 220 to private memory 222. In some examples, the PM array controller 214 can be configured to control access of Application A 204 or Application B 206 to private memory 222. In some examples, the primary computing functions for a second tier 224 of the multi-tenant, multi-tier computer system 200 are executed by the PM array controller 214.

A different protection domain exists for each type of function controlled by the PM array controller 214. For example, management functions 220 can control how memory is allocated among processes, what processes are to receive memory, and the amount of memory allotted for a process to be executed. Application functions 218 can, for example, control applications running on persistent memory. Application functions 218 may rely on information passed from the first tier 212 to identify the application making a request. Access to application functions 218 and data may be restricted by the PM array controller 214 based on access permissions, or encryption keys applied based on the application running through the management functions 220. Security may be enforced by either returning data based on decryption with the accessing application key, or by refusing the request for either data or access to remote functions. Storage functions 216 can, for example, control access to storage connected to the PM array controller 214. Storage access may be configured by management code based on trusted zones. In some examples, management code running on the PM array controller 214 can map a given request to a given PM module, across a tier of the multi-tier hierarchy. Limited by the configuration of storage functions 216, requests from the first tier 212 will not be provided with a path to memory not assigned to it. In some examples, the PM array controller 214 and functions contained thereon can be configured to control access of processes requesting to read or write on private memory 222. In some examples, the PM array controller 214 can control access to a persistent memory (PM) device controller 226 located below the second tier 224 of the multi-tenant, multi-tier computer system 200.

The PM device controller 226 can include storage functions 228, application functions 230, and management functions 232. The PM device controller 226 can enable access to NVM devices 234. The NVM devices 234 can include persistent memory. The PM device controller 226 can enable access to a persistent memory device in the form of a PM packaged field replaceable unit (FRU) 246. A second PM device controller 226 can also be included in the computer system 200. The second PM device controller 226 can also include storage functions 238, application functions 240, and management functions 242. The second PM device controller 226 can enable access to NVM devices 244. The second PM device controller 226 can enable access to a persistent memory device in the form of a removable PM field replaceable unit (FRU) 248.

In the first PM device controller 226, functions that belong to Application A 204 can be stored on a first zone 250 of a NVM device of the NVM devices 234, and functions belonging to Application B 206 can be stored on a second zone 252 of a NVM device of the NVM devices 234. Indication of the application requesting functions or data may be made at the second tier 224 along with the request. Access may be managed by application of encryption, or by restriction of access type. Access may include data reads, data writes, or permissions to use remote function provided within the PM device controller 226, 236, such as data search, compression, data re-ordering, or any other remote function provided. Similarly, persistent memory of NVM devices 234 can also contain storage segregated for use only by Application A 204, and storage segregated for use only by Application B 206. In the second PM device controller 236, functions that belong to Application A 204 can be stored on a first zone 254 of a NVM device of the NVM devices 244, and functions belonging to Application B 206 can be stored on a second zone 256 of a NVM device of the NVM devices 244. Storage functions 228, 238 may, for example, support multiple PM array controllers 214 by assigning segregated PM space. Further, storage functions 228, 238 may be configured to allow multiple applications or multiple PM array controllers 214 access to a shared region of PM space, and each may have differing access permissions (read, write, or remote function access). In some examples, the primary computing functions for a third tier 258 of the multi-tenant, multi-tier computer system 200 are executed by a PM device controller 226, 236.

The processor and operating system 202 is in the tier 212 above tier 224 where the PM array controller 214 resides, and the PM array controller 214 is in the tier 224 above the tier 258 in which the PM device controllers 226, 226 reside. Application A 204 can send a request to the processor and operating system 202, which can send the request down to the PM array controller 214. The PM array controller 214 can handle the request and send it down to a PM device controller 226 to read or store some piece of data on persistent memory of a NVM device of the NVM devices 234, for example.

The first tier 212 includes multiple applications running on the processor and operating system 202, and the processor and operating system 202 is the primary computing function of the first tier 212. The PM array controller 214 also includes a processor and storage system to implement a security framework described herein at the second tier 224. The PM device controller 226 includes a processor and a storage system and comprises a nonvolatile memory device, and the storage system includes code to implement the security framework at the third tier 258. The security framework provides independent permissions to the multiple applications for different devices of the computer system 200, including NVM devices 234, 244, private memory 208, 222, and persistent memory on PM FRUs 246, 248. The security framework is implemented across multiple layers of the computer system 200, across multiple protection domains that are segregated and have different authorization levels. The security framework provides multi-tenant protection between multiple applications running on computer system 200, while providing multi-tier protection between storage and computing functions of the first tier 212, second tier 224, and third tier 258.

The block diagram of FIG. 2 is not intended to indicate that the computer system 200 is to include all of the components shown in FIG. 2. Any number of additional components may be included within the computer system 200, depending on the details of the devices and specific implementation of the multi-tenant and multi-tier security framework described herein. For example, the items discussed are not limited to the functionalities mentioned, but the functions could be done in different places, or by different components. Further, any number of additional steps may introduced for variations of the security framework that may be implemented.

Figure 3:
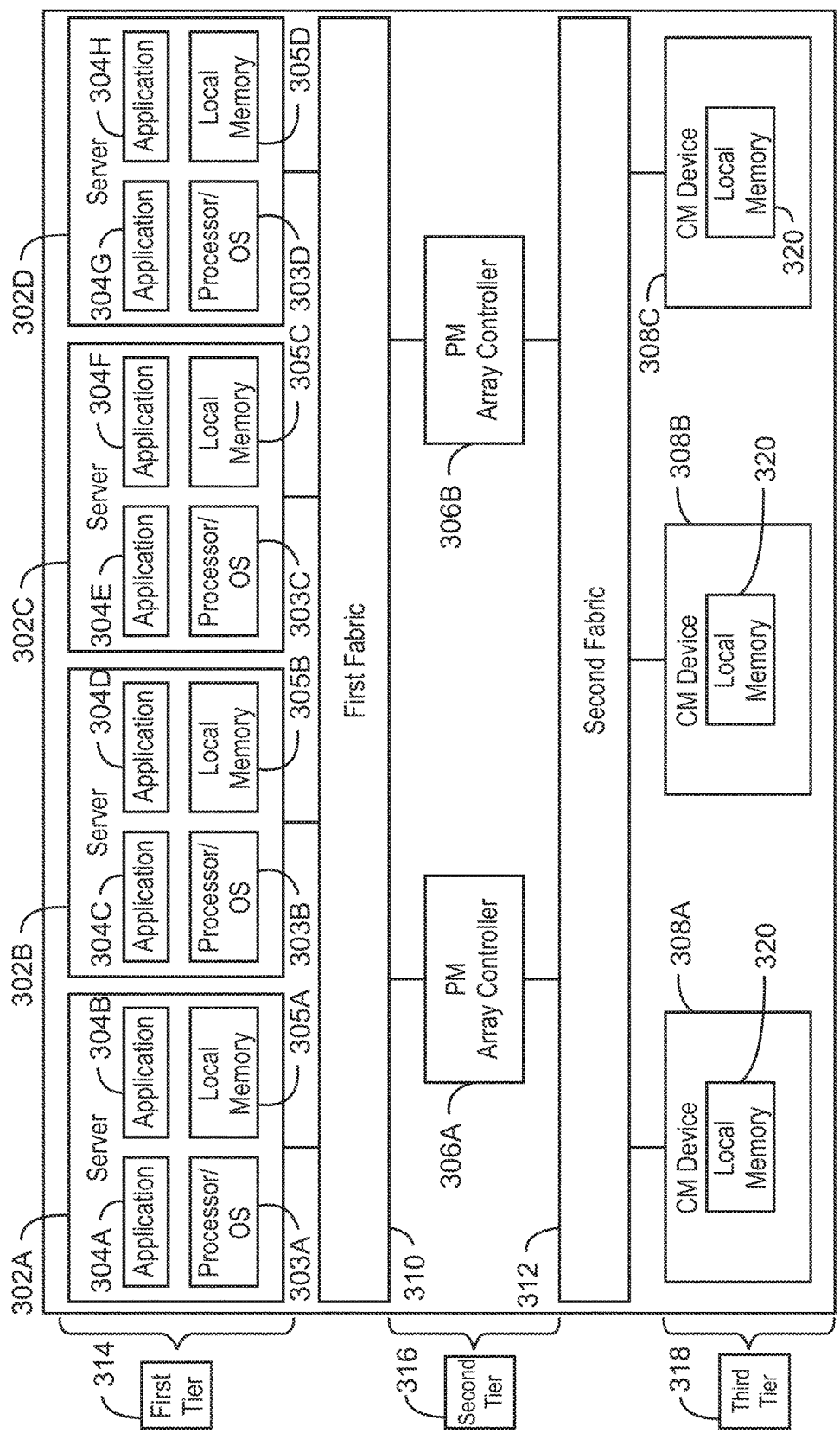
FIG. 3 is a block diagram illustrating a computer system with converged memory and shared storage.

FIG. 3 is a block diagram illustrating a computer system 300 with converged memory and shared storage. In some examples, components of FIG. 3 can also be described as like components are described with respect to FIG. 2 above. The computer system 300 includes servers 302A, 302B, 302C, 302D, each with an independent processor and operating system 303A, 303B, 303C, 303D, which host applications 304A, 304B, 304C, 304D, 304E, 304F, 304G, 304H. The servers also include local memory 305A, 305B, 305C, 305D.

The computer system 300 includes persistent memory (PM) array controllers 306A, 306B that are shared with the servers 302. A plurality of converged memory and storage (CM) devices 308A, 308B, 308C, 308D are shared with the servers 302. The access of the applications 304 to persistent memory on CM devices 308 is controlled through the security framework described herein. The computer system 300 can include a first fabric 310 between the tier of servers 302 and the PM array controllers 306. The computer system 300 can include a second fabric 312 between the PM array controllers 306 and the CM devices 308. The first fabric 310 and the second fabric 312 are to provide connectivity between the servers 302, PM array controllers 306, and CM devices 308 as illustrated in FIG. 3. For example, application 304A running on server 302A uses the first fabric 310 to communicate with the first PM array controller 306A, which in turn stores data on CM devices 308A, 308B, 308C via the second fabric 312.

In examples, application 304A runs in a first tier 314 of the computer system 300, and is authorized to communicate with the first PM array controller 306A that runs on a second tier 316 of the computer system 300. For example, the first PM array controller 306A is configured to recognize application 304A and associate application 304A with a first protection domain. The first PM array controller 306A running at the second tier 316 authorizes application 304A to communicate through the first fabric 310 over a path defined from server 302A. At the second tier 316, application 304A is authorized to use a redundant array of independent disks (RAID 5) storage function and to communicate with CM devices 308A, 308B, 308C. The CM devices 308A, 308B, 308C are running on a third tier 318, and, for example, can be configured to associate application 304A with the first protection domain, expecting communication through the second fabric 312 via the first PM array controller 306A. Application 304A is enabled to use an encryption storage function at the third tier 318 to access downstream memory addresses 1-999, residing on local memory 320, of CM devices 308A, 308B, 308C.

In some examples, application 304B running at the first tier 314 on server 302A also accesses the first PM array controller 306A, however application 304B can be associated with a second protection domain. For example, at the second tier 316, the PM array controller 306A enables communication from application 304B on server 302A, and enables the application function called "merge". This allows application 304B to use functionality at the second tier 316 to merge search results from search functions running in the third tier 318, for example. In such an example, application 304B is not enabled to use the RAID 5 storage function. However, at the third tier 318 application 304B is enabled to use the "search" application function with downstream memory addresses 1000-1999, residing on local memory 320 of CM devices 308A, 308B, 308C.

In some examples, application 304C shares data with application 304A, so application 304C is also associated with the first protection domain. Application 304C would then have the same security configuration as application 304A, except that application 304C is only allowed to communicate with PM controller 1 via a path defined from server 302B.

In some examples, application 304D can use of the same storage functions as application 304A at the first tier 314 and at the second tier 316 through a third protection domain. The third protection domain, for example, can mandate communication only through the path defined from server 302B at the second tier 316, with access to the third tier 318 only to downstream memory addresses 2000-2999 of local memory 320 on CM devices 308A, 308B, 308C. Unlike applications 304A, 304B, and 304C, application 304D in this example is only enabled to use the second PM array controller 306B.

The examples described with respect to FIG. 3 implement the security framework for a multi-tenant and multi-tier computer system such as computer system 300. The PM array controllers 306A, 306B and the CM devices 308A, 308B, 308C can reject any attempt by any application to access any data or functions not configured into the security framework.

The block diagram of FIG. 3 is not intended to indicate that the computer system 300 is to include all of the components shown in FIG. 3. Any number of additional components may be included within the computer system 300, depending on the details of the devices and specific implementation of the multi-tenant and multi-tier security framework described herein. For example, the items discussed are not limited to the functionalities mentioned, but the functions could be done in different places, or by different components. Further, any number of additional steps may introduced for variations of the security framework that may be implemented.

TABLE 1

Permissions, Protection IDs, and Authorized Paths

| Application ID | Protection Domain | HW Path In | Tier | Storage Function | Application Function | Downstream Address |
|---|---|---|---|---|---|---|
| A | | | 1 | | | PM Ctlr 1 |
| A | 1 | App Srvr 1 | 2 | RAID 5 | none | CM 1-3 |
| A | 1 | PM Ctlr 1 | 3 | encryption | none | 1-999 |
| B | | | 1 | | | PM Ctlr 1 |
| B | 2 | App Srvr 1 | 2 | none | merge | CM 1-3 |
| B | 2 | PM Ctlr 1 | 3 | encryption | search | 1000-1999 |
| C | | | 1 | | | PM Ctlr 1 |
| C | 1 | App Srvr 2 | 2 | RAID 5 | none | CM 1-3 |
| C | 1 | PM Ctlr 1 | 3 | encryption | none | 1-999 |

TABLE 1-continued

Permissions, Protection IDs, and Authorized Paths

| Application ID | Protection Domain | HW Path In | Tier | Storage Function | Application Function | Downstream Address |
|---|---|---|---|---|---|---|
| D | | | 1 | | | PM Ctlr 2 |
| D | 3 | App Srvr 2 | 2 | RAID 5 | none | CM 1-3 |
| D | 3 | PM Ctlr 2 | 3 | encryption | none | 2000-2999 |

Table 1 shows a protection configuration for applications in a multi-tenant, multi-tier security framework, like that described in FIG. 3, for example. There is one row in the table for each application containing information at each tier. Application A runs in tier 1 and is authorized to communicate with PM controller 1. PM controller 1 is configured to recognize application A and associate it with protection domain 1. Running at tier 2, PM controller 1 authorizes application A to communicate through fabric 1 over the path from server 1. At tier 2, application A is authorized to use the RAID 5 storage function and to communicate with CM devices 1-3. At tier 3, CM devices 1-3 are configured to associate application A with protection domain 1 expecting communication through fabric 2 via PM controller 1. Application A is enabled to use the encryption storage function at tier 3 to access memory addresses 1-999 on CM devices 1-3.

Running at tier 1 on server 1, application B also accesses PM controller 1, however this access is associated with protection domain 2. At tier 2 the PM controller enables communication from application B over the path from server 1 to use the application function called "merge". This allows application B to use functionality at tier 2 to merge search results from search functions running in tier 3. Application B is not enabled to use the RAID storage function, however at tier 3 it is enabled to use the "search" application function with memory addresses 1000-1999.

Application C can share data with application A, so application C is also associated with protection domain 1. Application C has the same security configuration as application A, except that application C is only allowed to communicate with PM controller 1 via the path from server 2.

Application D illustrates the use of the same storage functions as application A at tiers 2 and 3. Application D is associated with protection domain 3, which mandates communication only through the path from server 2 at tier 2, and with tier 3 access only to memory addresses 2000-2999. Unlike the other applications, application D is only enabled to use PM controller 2 in this example.

Using the information in Table 1, the PM controllers and the CM devices can reject any attempt by any application to access any data or functions not configured into the security framework. In addition, unknown applications can be rejected because of the lack of permissions, or if the applications masquerade as a known application through an unexpected path, for example. This example does not limit the permutations of applications, tiers, pathways, or functions that can be represented in the security framework described herein. The security framework distinguishes different protection IDs, application IDs, paths, and permission levels. A permission level is assigned for each of the applications and across each tier. Communication pathways, application IDs, and permission levels can be defined in a protection policy for each of the applications. There are various ways to define and bind these data to a specific transaction so that any compute or storage entity on any tier can know which protection policies to apply to any transaction.

Figure 4:
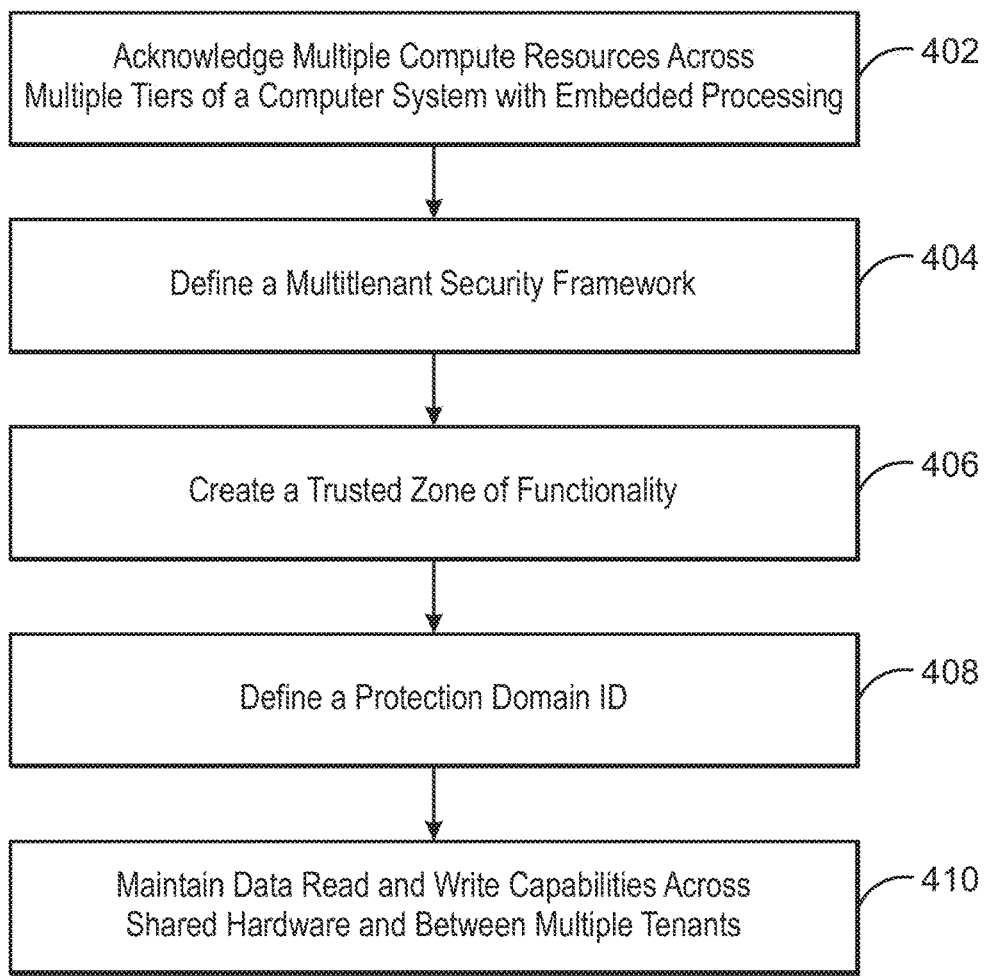
FIG. 4 is a process flow diagram of an example method to implement a security framework for multiple tenants across multiple tiers with independent computing resources in a computer system.

FIG. 4 is a process flow diagram of an example method 400 to implement a security framework for multiple tenants across multiple tiers with independent computing resources in a computer system. The security framework can prevent one application running on a higher tier of the computer system from accessing areas of storage and other devices designated for a different application. The security framework can also ensure that data accessed from volatile memory of persistent memory present in the computer system is protected, even when that data is not being accessed.

The method 400 begins at block 402, where multiple computing resources are acknowledged by the security framework. The multiple computing resources can be located across multiple tiers of the computer system with embedded processing. Each tier of the computer system will thus include independent hardware with independent computing resources and functions. The security framework acknowledges when a tier of the plurality of tiers in the computing and storage hierarchy has computing resources capable of creating, accessing, or modifying data objects both within the tier, and within any other tier of the plurality of tiers.

At block 404, a multi-tenant, multi-tier security framework is defined all at tiers of the computer system. The security framework is to prevent an application at a tier of the computer system from corrupting or accessing data at that tier, or at tiers above or below that tier, without proper permission. When a first application on a particular tier of the computer system is no longer using computing resources, the security framework prevents the OS from mistakenly allowing a second application to access data that used to belong to the first application. This protection can be implemented across the multiple tiers using hardware such as, for example, a PM array controller and a PM device controller like those described in FIG. 2. The method 400 implements multiple levels of security with multiple tenants, with independent functionality of the security framework at every level or tier of the storage and computing hierarchy of the computer system.

At block 406, a trusted zone of functionality is created for a programmable core located on each tier of the plurality of tiers. The trusted zone of functionality is for each tier and each tenant of the computer system. The trusted zone of functionality is validated before access to data is allowed for a particular application requesting access to data at a particular tier. The trusted zone of functionality can be defined for any code that executes anywhere in the computer system. Not all tenants are to access all tiers, and even when multi-tenants are enabled on a given tier, a firewall is used to prevent different tenants from disturbing a trust zone established for another tenant. A firewall can be implemented, for example, to prevent changes in the code to any devices or resources that are not authorized. The authority to update or install trusted zone code, which includes code that establishes default behaviors, that sterilizes data object space, or control access rights for other code entities, can be validated through the trusted zone of functionality.

At block 408, a protection domain ID is defined for a transaction on fabric between tiers of the plurality of tiers on the computer system with embedded processing. The fabric between tiers of the computing system incorporate a protection domain ID for recognizing a requestor that wants to gain access to a data file at a particular tier. The use of the protection domain ID is a hardware-generated process to indicate a requestor with sufficient granularity detail. The protection domain ID provides protection at the level of address space granularity required for multiple tenants.

When a first application is no longer present, the security framework can deny access of a second application through, for example, an operating system of the computer device. The security framework can deny access, for example, through a processing environment located at the tier where a request is sent. This security framework can ensure the second application does not inherit resources that belong only to the first application. Without the protection domain ID, a request on the fabric cannot be sufficiently linked to a trusted requestor. The protection domain ID identifies a requestor, as the requestor can, for example, initialize a key that identifies the requestor as being permitted to access the particular data at a particular tier of the computer system.

Every functional layer for computing hardware of the computer system includes authorization and authentication mechanisms to enable multi-tenancy at every tier. In some examples, more privileged layers on the hardware of a tier, for example, management functions, are able to establish the keys or permissions for a layer of the tier with lower access privileges, for example, application functions and storage functions. In such an example, management functions can establish the permissions for application functions for a particular device, and application functions can establish whether a particular storage function is allowed to access a particular device. The storage function is at the lowest privilege layer, and would not establish authorizations but rather provide data at the tier the storage function is located for a requestor that has the correct permissions.

The method 400 continues at block 410, where data read and write capabilities are maintained across shared hardware of the computer system, and between multiple tenants on the computer system. In some examples, the computer system can have processing capabilities at the OS and main processor, at storage levels in persistent memory, and at intermediate processors, for example, PM array controller and PM device controller of FIG. 2. Because all levels of the computer system can include persistent memory and thus require security that is normally not necessary for volatile memory, the method 400 and security framework establishes data-at-rest security in all levels of the converged storage and memory hierarchy of the computer system. The method 400 and security framework does not sacrifice data-at-rest security while providing consistent data-in-use security. In some examples, memory and storage are occupying the same devices, and the processing power for storage operations and computing operations become combined. The method 400 establishes the security for embedded processing elements within a converged storage and memory computer system, while enabling multi-tenant use of the embedded processors at different levels of the computer system.

The method 400 of FIG. 4 is not intended to indicate that method 400 is to include all of the steps shown in FIG. 4. Further, any number of additional steps may be included within the method 400, including, for example, steps described with respect to the method in FIG. 5.

Figure 5:
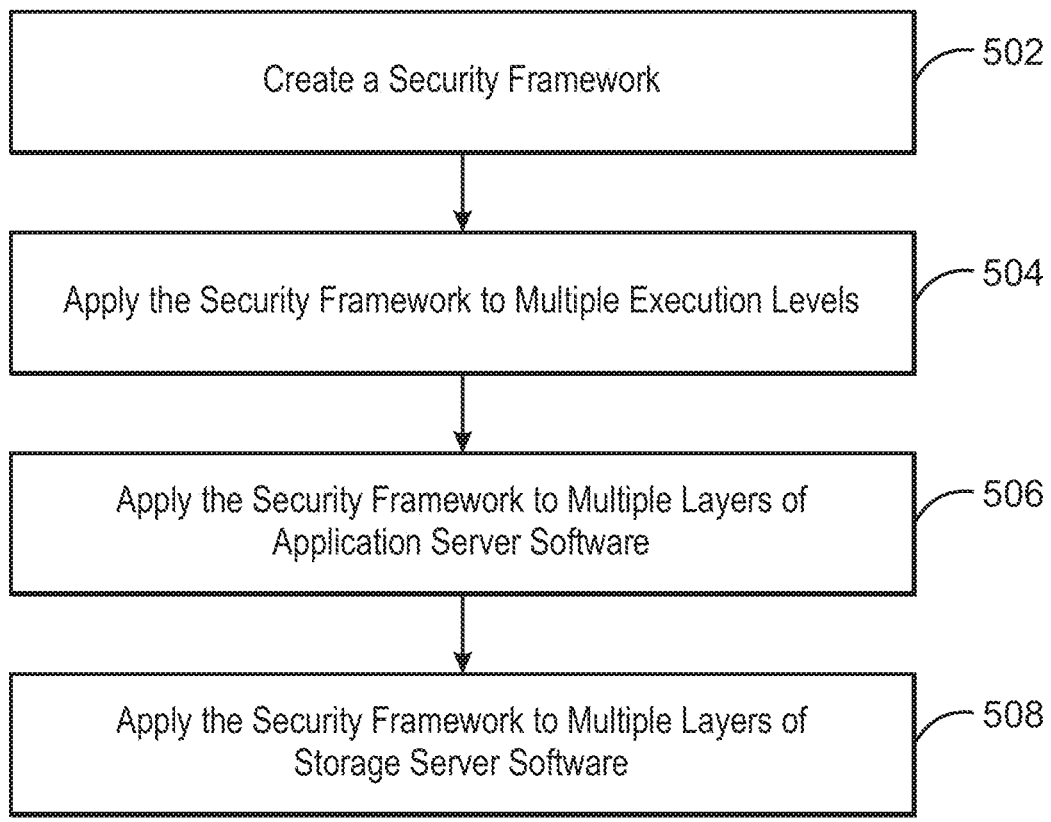
FIG. 5 is a process flow diagram of an example method to implement a security framework on a memory device with embedded processing.

FIG. 5 is a process flow diagram of an example method 500 to implement a security framework on a memory device with embedded processing. The method 500 can be implemented using the computer system described with respect to FIGS. 1, 2, and 3, for example. The method 500 begins at block 502, where a security framework is created across multiple tiers and multiple tenants of the computer system. The security framework can be a multi-tenant security framework for a combined processing and storage hierarchy. The combined processing and storage hierarchy can consist of multiple persistent memory devices. The combined processing and storage hierarchy can consist of multiple tiers of hardware with independent computing resources.

At block 504 the security framework is applied to multiple execution levels of the memory device. Each execution level can consist of hardware with independent computing functions and resources, and hardware may include, for example, processors, and persistent memory. The security framework can acknowledge whether an execution level of the combined processing and storage hierarchy is permitted to access and modify data objects outside the bounds of the execution level. The security framework is to control access to data by creating a trusted zone of functionality for the multiple execution levels and for hardware levels in the memory device. The security framework can also define firewalls between applications and storage located at different execution levels that make up the combined processing and storage hierarchy.

At block 506, the security framework is applied to multiple layers of application server software. At block 508, the security framework is applied to multiple layers of storage server software. Application and storage servers can use persistent main memory technologies to host the same data objects for their solutions. Both application servers and storage servers can execute the solutions in distributed hardware, arranged, for example, in combinations of clustered peers and multiple levels of a hardware hierarchy. The security framework can be applied for converged server and storage infrastructures that encompass multiple tiers of application and storage computing resources, which are embedded alongside multiple layers of data object storage in a multi-tenant environment with concurrent access.

The method 500 of FIG. 5 is not intended to indicate that method 500 is to include all of the steps shown in FIG. 5. Further, any number of additional steps may be included within the method 500, including, for example, steps described with respect to the method in FIG. 4.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A computer system, comprising:
 A first tier, a second tier, and a third tier, wherein:
  the first tier comprises a plurality of applications running on a processor, wherein the processor is the primary computing function of the first tier;
  the second tier comprises a persistent memory array controller, wherein the persistent memory array controller comprises a processor and a storage system, wherein the storage system includes code to implement a security framework at the second tier, and wherein the security framework provides independent permissions to the plurality of applications; and
the third tier comprises a persistent memory device controller, wherein the persistent memory device controller comprises a processor and a storage system and comprises a nonvolatile memory device, wherein the storage system includes code to implement the security framework at the third tier, and wherein the security framework provides independent permissions to the plurality of applications.

2. The computer system of claim 1, wherein the security framework provides multi-tenant protection between the plurality of applications.

3. The computer system of claim 1, wherein the security framework provides multi-tier protection between the first tier, the second tier, and the third tier.

4. The computer system of claim 1, wherein the persistent memory array controller further comprises storage functions, application functions, and management functions.

5. The computer system of claim 4, wherein access to the storage functions, application functions, and management functions by the plurality of applications is controlled by the security framework.

6. The computer system of claim 1, wherein the persistent memory device controller further comprises storage functions, application functions, and management functions.

7. The computer system of claim 6, wherein access to the storage functions, application functions, and management functions by the plurality of applications is controlled by the security framework.

8. The computer system of claim 1, wherein access to nonvolatile memory devices by the plurality of applications is controlled by the security framework.

9. The computer system of claim 1, wherein the security framework allows access of a first application of the plurality of applications to storage and memory on the second tier and the third tier, and wherein the security framework denies access of a second application of the plurality of applications to storage and memory on the second tier and the third tier.

10. The computer system of claim 1, wherein a protection policy is defined for each of the plurality of applications, and wherein the protection policy includes a protection domain, an application ID, a permission level, and a communication pathway are defined for each of the plurality of applications.

11. A method to provide security on a memory device with embedded processing, comprising:
creating a multi-tenant security framework for a combined processing and storage hierarchy of multiple tiers;
applying the multi-tenant security framework to multiple execution levels of the memory device;
applying the multi-tenant security framework to multiple layers of application server software of the memory device; and
applying the multi-tenant security framework to multiple layers of storage server software of the memory device.

12. The method of claim 11, wherein the multi-tenant security framework is to acknowledge whether an execution level is permitted to access and modify data objects outside the bounds of the execution level.

13. The method of claim 11, wherein the multi-tenant security framework is controlling access to data by creating a trusted zone of functionality for the multiple execution levels and for hardware levels in the memory device.

14. A method to implement a security framework for multiple tenants across multiple tiers with independent computing resources in a computer system, comprising:
acknowledging when a tier of the plurality of tiers in a computing and storage hierarchy has computing resources capable of creating, accessing, or modifying data objects both within the tier, and within any other tier of the plurality of tiers;
defining a multi-tenant security framework all at tiers of the plurality of tiers;
creating a trusted zone of functionality for a programmable core located on each tier of the plurality of tiers, wherein the trusted zone of functionality is validated before access to data is allowed;
defining a protection domain ID for a transaction on fabric between a tier of the plurality of tiers on the computer device with embedded processing; and
maintaining data read and write capabilities across shared hardware and between multiple tenants on the computer device with embedded processing.

15. The method of claim 14, further comprising defining a protection policy for each of the multiple tenants across multiple tiers, and wherein the protection policy includes a protection domain, an application ID, a permission level, and a communication pathway defined for the multiple tenants across multiple tiers.

* * * * *